(12) United States Patent
Lim et al.

(10) Patent No.: US 8,940,659 B2
(45) Date of Patent: Jan. 27, 2015

(54) GAS PURIFYING CATALYST FOR INTERNAL COMBUSTION ENGINE

(71) Applicant: Hyundai Motor Company, Seoul (KR)

(72) Inventors: Cheol Beom Lim, Seoul (KR); Yoon Sang Nam, Gyeonggi-do (KR); Jin Woo Choung, Gyeonggi-do (KR); Youngil Song, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/916,072

(22) Filed: Jun. 12, 2013

(65) Prior Publication Data

US 2014/0171301 A1 Jun. 19, 2014

(30) Foreign Application Priority Data

Dec. 17, 2012 (KR) .................. 10-2012-0147763

(51) Int. Cl.
| | |
|---|---|
| *B01J 23/00* | (2006.01) |
| *B01J 23/02* | (2006.01) |
| *B01J 23/08* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 21/04* | (2006.01) |
| *B01J 20/00* | (2006.01) |
| *B01J 23/63* | (2006.01) |

(52) U.S. Cl.
CPC .......... *B01J 23/63* (2013.01); *Y10S 502/52712* (2013.01); *Y10S 502/52713* (2013.01)
USPC ........... 502/326; 502/302; 502/303; 502/304; 502/327; 502/332; 502/333; 502/334; 502/339; 502/349; 502/355; 502/415; 502/439; 502/527.12; 502/527.13

(58) Field of Classification Search
USPC ......... 502/302–304, 326, 327, 332–334, 339, 502/349, 355, 415, 439, 527.12, 527.13
See application file for complete search history.

(56) References Cited

U.S. PATENT DOCUMENTS

| | | | | |
|---|---|---|---|---|
| 5,597,771 | A * | 1/1997 | Hu et al. | 502/304 |
| 5,948,723 | A * | 9/1999 | Sung | 502/303 |
| 6,087,298 | A * | 7/2000 | Sung et al. | 502/333 |
| 6,764,665 | B2 * | 7/2004 | Deeba et al. | 423/239.1 |
| 7,374,729 | B2 * | 5/2008 | Chen et al. | 422/177 |
| 7,501,098 | B2 * | 3/2009 | Chen et al. | 422/177 |

(Continued)

FOREIGN PATENT DOCUMENTS

| | | |
|---|---|---|
| EP | 1252924 A1 | 10/2002 |
| JP | 4164884 B2 | 10/2008 |

(Continued)

*Primary Examiner* — Cam N. Nguyen
(74) *Attorney, Agent, or Firm* — Edwards Wildman Palmer LLP; Peter F. Corless

(57) ABSTRACT

Disclosed is a gas purifying catalyst for an internal combustion engine comprising: a carrier and a catalyst layer formed on the carrier, the catalyst layer including a first catalyst, a second catalyst and a third catalyst. The first catalyst comprises Pd supported in a first support, the first support comprising alumina. The second catalyst comprises Rh supported in a second support, the second support comprising a complex oxide of ceria-zirconia. The third catalyst comprising Pd supported in a third support, the third support comprising a complex oxide of ceria-zirconia.

13 Claims, 4 Drawing Sheets

12    10    22    24

(56) References Cited

U.S. PATENT DOCUMENTS

| | | | |
|---|---|---|---|
| 7,517,510 B2 * | 4/2009 | Chen et al. | 423/213.2 |
| 7,524,465 B2 * | 4/2009 | Kumar et al. | 422/180 |
| 7,550,124 B2 * | 6/2009 | Chen et al. | 423/213.2 |
| 7,758,834 B2 * | 7/2010 | Chen et al. | 423/213.2 |
| 8,007,750 B2 * | 8/2011 | Chen et al. | 423/239.1 |
| 8,038,951 B2 * | 10/2011 | Wassermann et al. | 422/168 |
| 8,252,258 B2 * | 8/2012 | Muller-Stach et al. | 423/213.2 |
| 8,586,675 B2 * | 11/2013 | Hirata et al. | 525/191 |
| 2007/0025901 A1 * | 2/2007 | Nakatsuji et al. | 423/239.2 |
| 2008/0044330 A1 * | 2/2008 | Chen et al. | 423/213.5 |
| 2009/0175773 A1 * | 7/2009 | Chen et al. | 423/213.5 |
| 2011/0107752 A1 * | 5/2011 | Galligan et al. | 60/299 |
| 2013/0189173 A1 * | 7/2013 | Hilgendorff et al. | 423/213.5 |

FOREIGN PATENT DOCUMENTS

| | | |
|---|---|---|
| KR | 10-2004-0047966 A | 6/2004 |
| KR | 10-2004-0048919 A | 6/2004 |
| KR | 10-0776186 | 11/2007 |

* cited by examiner 12   10   22   24

GAS PURIFYING CATALYST FOR INTERNAL COMBUSTION ENGINE

CROSS-REFERENCE TO RELATED APPLICATION

This application claims priority to and the benefit of Korean Patent Application No. 10-2012-0147763 filed in the Korean Intellectual Property Office on Dec. 17, 2012, the entire contents of which are incorporated herein by reference.

BACKGROUND OF THE INVENTION (a) Field of the Invention

The present invention relates to a gas purifying catalyst for an internal combustion engine.

(b) Description of the Related Art

Recently, studies for removing contaminant materials included in exhaust gas exhausted from internal combustion engines of vehicles or the like have been actively conducted with the goal of protecting the global environment.

Examples of contaminant materials included in exhaust gas include carbon monoxides (CO), hydrocarbons (HC), nitrogen oxides ($NO_x$), and the like. A three way catalyst, which may simultaneously oxidize and reduce three harmful materials (e.g. carbon monoxides, hydrocarbons, and nitrogen oxides) to thereby purify the materials, is extensively used to convert the contaminant materials into harmless materials.

The three way catalyst must have high heat resistance because the catalyst needs to be operated under a high temperature environment.

Further, since the three way catalyst is used under the high temperature environment, in the case where the three way catalyst is supported on a carrier, there is a problem in that noble metals in a catalyst layer of the three way catalyst form alloys. This reduces the activity of the catalyst. FIG. 1A illustrates a current technology of using a double layer structure including a lower layer in which noble metal Pd 52 is carried in a first support 40 and an upper lower layer in which Rh 54 is carried in a second support 42. This structure is generally applied in order to prevent the problem of alloy formation. As illustrated in FIG. 1B, when the catalyst of the double layer structure is used at high temperatures, Pd and Rh exist separately in the lower layer and the upper layer, thus preventing alloying thereof.

However, the double layer structure technology has a problem in that manufacturing costs are increased. As such, a single layer catalyst technology is preferable.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a gas purifying catalyst for an internal combustion engine, which can be used at high temperatures without a deterioration in activity.

According to one aspect, the present invention provides a gas purifying catalyst for an internal combustion engine, including: a carrier and a catalyst layer formed on the carrier, wherein the catalyst layer includes a first catalyst, a second catalyst and a third catalyst. According to various embodiments, the first catalyst, second catalyst and third catalyst are different from each other. According to an exemplary embodiment, the first catalyst comprises palladium (Pd) supported in a first support the second catalyst comprises rhodium (Rh) supported in s second support, and the third catalyst comprises Pd supported in a third support. The first, second and third supports can be any combination of supports materials and configurations conventionally used, and one or more of the first, second and third supports can be different from one or more of the other support. According to an exemplary embodiment, the first support comprises at least alumina (Al), the second support comprises at least a complex oxide of ceria-zirconia, and the third support comprises at least a complex oxide of ceria-zirconia. The supports can comprise only the noted materials (e.g. Al, complex oxide of ceria-zirconia), or they can include one or more additional materials.

According to various embodiments, the first support further includes lanthanum (La). Preferably, a content of La is about 0.5 wt % to about 5 wt % based on 100 wt % of the entire first support (i.e. based on the total weight of the first support which comprises at least Al and La). According to various embodiments, the second support and/or the third support includes about 20 wt % to about 70 wt % of ceria and about 80 wt % to about 30 wt % of zirconia, based on 100 wt % of the entire second support.

According to various embodiments, the second support and/or the third support further includes an additive selected from La, Nd, Si, Pr, or a combination thereof. Preferably, a content of the additive is about 1 wt % to about 20 wt % based on 100 wt % of the entire second support (i.e.) or based on 100 wt % of the entire third support (i.e. based on the total weight of the second support which comprises at least a complex oxide of ceria-zirconia and one or more additive).

According to various embodiments, a mixing ratio of the first catalyst, the second catalyst, and the third catalyst is about 60:20:20 wt % to about 50:30:20 wt %.

According to an exemplary embodiment of the present invention, a loading amount of Pd in the first catalyst is about 1 wt % to about 4 wt % based on 100 wt % of the first support, and a loading amount of Rh in the second catalyst is about 0.1 wt % to about 1 wt % based on 100 wt % of the second support. In addition, a loading amount of Pd in the third catalyst may be about 1 wt % to about 4 wt % based on 100 wt % of the third support.

According to the present invention, a gas purifying catalyst for an internal combustion engine is provided which has excellent heat resistance, and wherein alloying of a noble metal contained therein is suppressed even when the gas purifying catalyst is exposed to high temperatures. As such, the gas purifying catalyst of the present invention exhibits excellent catalytic activity even when exposed to high temperatures.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
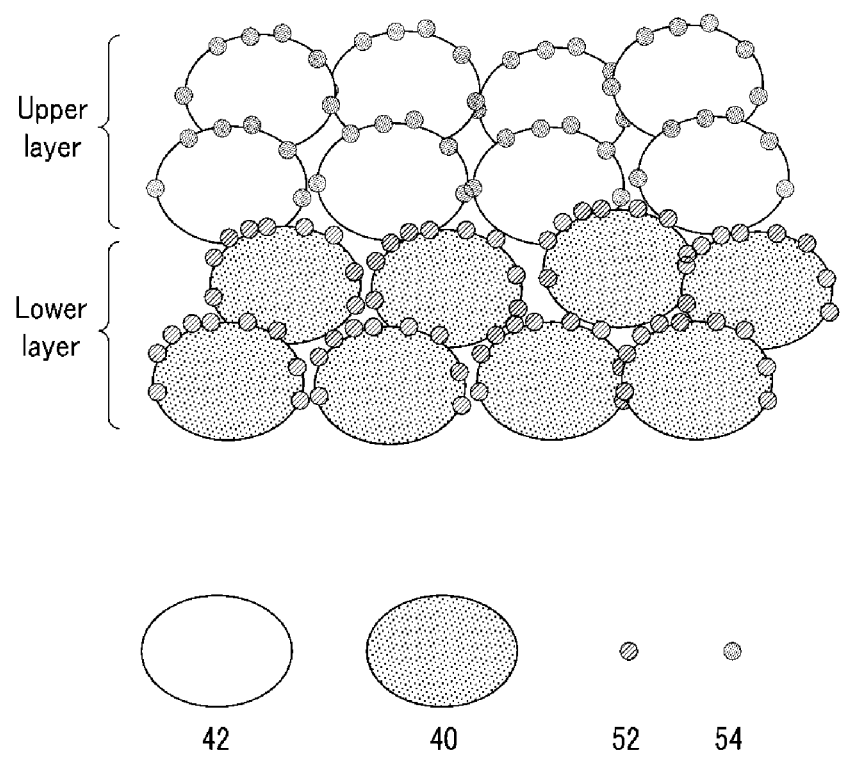
FIGS. 1A and 1B are views schematically illustrating a conventional double layer catalyst structure.
Figure 1B:
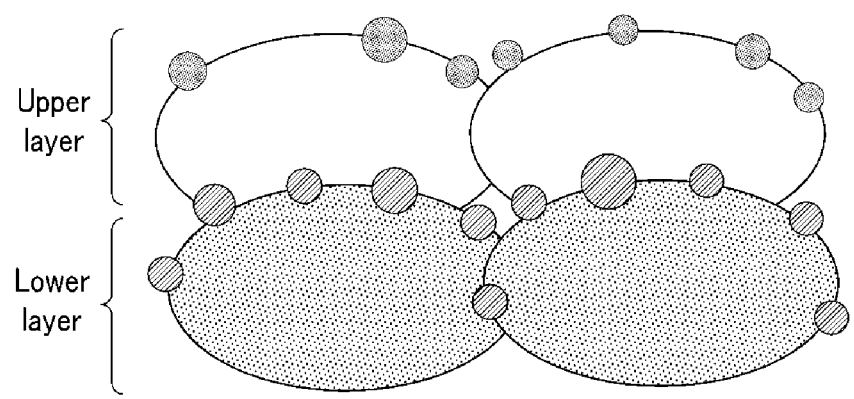
Figure 1B:
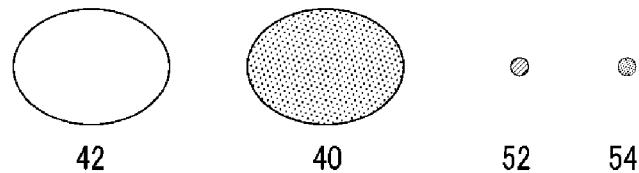

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter, an exemplary embodiment of the present invention will be described in detail. However, the exemplary embodiment is illustrative only but is not to be construed to limit the present invention, and the present invention is just defined by the scope of the claims as described below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about.

A gas purifying catalyst for an internal combustion engine according to an exemplary embodiment of the present invention includes a carrier and a catalyst layer formed on the carrier, in which the catalyst layer includes a first catalyst, a second catalyst, and a third catalyst. The first catalyst, second catalyst, and third catalyst are different from each other. Preferably, the first catalyst comprises Pd supported in a first support, the second catalyst comprises a Rh supported in a second support, and the third catalyst comprises Pd supported in a third support.

According to an exemplary embodiment, the first support comprises at least Al, the second support comprises at least a complex oxide of ceria-zirconia, and the third support comprises at least a complex oxide of ceria-zirconia. The complex oxides of ceria-zirconia in the second and third supports may be the same or may be different. The first, second, and/or third supports may comprise one or more additional materials, if desired.

According to a preferred embodiment, the catalyst layer is represented by a wash-coat layer. However, any other forms and types of catalyst layers may alternatively be provided.

In particular, the catalyst layer of the present invention is a single layer and includes the first catalyst, the second catalyst, and the third catalyst all formed in the single layer. Further, active metals of the first catalyst, the second catalyst, and the third catalyst (e.g. Pd and Rh), are supported in different supports. As such, even though the catalyst is used at high temperatures, a common phenomenon in which the active metals are bonded to each other to cause alloying may be prevented, and thus an alloying phenomenon is insignificant. Accordingly, when the gas purifying catalyst for the internal combustion engine is used at high temperatures, deterioration in catalytic activity caused by alloying of active metals is suppressed. As a result, the present invention gas purifying catalyst for the internal combustion engine has excellent heat resistance. Further, by providing the catalyst layer of the present invention with the third catalyst which includes Pd supported in a third support, the third support comprising at least a complex oxide of ceria-zirconia, purifying efficiency is additionally improved.

In an exemplary embodiment of the present invention, the first support includes alumina. Preferably, γ-alumina is used as the alumina. However, other forms of alumina may also suitably be used.

The first support may further include La together with alumina. In this case, La may exist in any form and preferably is doped in the alumina. According to embodiments of the present invention, by including La in the first support, heat resistance is further improved. Preferably, a content of La is about 0.5 wt % to about 5 wt % based on 100 wt % of the entire first support (including alumina and La). In the case where the content of La is included in the aforementioned range, the effect of improving heat resistance is more improved.

The second support may include about 20 wt % to about 70 wt % of ceria and about 80 wt % to about 30 wt % of zirconia, based on 100 wt % of the entire second support (when other materials are not included) or based on 100 wt % of the ceria and zirconia in the second support (when other materials are included). In the case where the contents of ceria and zirconia are included in the aforementioned the range, optimum oxygen storing capacity (OSC) performance may be obtained.

The second support may further include an additive selected from La, Nd, Si, Pr, or a combination thereof. In the case where the second support further includes the additive, heat resistance may be further increased. In particular, Pr may improve the oxygen storage capacity as well as heat resistance of the support.

According to various embodiments, a content of the additive is preferably about 1 wt % to about 20 wt % based on 100 wt % of the entire second support (i.e., based on 100 wt % of all of ceria, zirconia, and additive). In the case where the content of the additive is less than about 1 wt % or more than about 20 wt %, there may be problems in that the oxygen storage capacity of the second support may deteriorates and costs are increased.

The third support may include about 20 wt % to about 70 wt % of ceria and about 80 wt % to about 30 wt % of zirconia, based on 100 wt % of the entire third support (when other materials are not included) or based on 100 wt % of the ceria and zirconia in the third support (when other materials are included). In the case where the contents of ceria and zirconia in the third support are included in this range, optimum oxygen storing capacity (OSC) performance may be obtained.

The third support may further include an additive selected from La, Nd, Si, Pr, or a combination thereof. In the case where the third support further includes the additive, heat resistance may be further increased. In addition the increased heat resistance, addition of Pr may further improve the oxygen storage capacity of the support.

Preferably, a content of the additive is about 1 wt % to about 20 wt % based on 100 wt % of the entire third support (i.e., based on 100 wt % of all of ceria, zirconia, and additive). In the case where the content of the additive is less than about 1 wt % or more than about 20 wt %, there may be problems in that the oxygen storage capacity of the third support deteriorates and costs are increased.

In an exemplary embodiment of the present invention, a mixing ratio of the first catalyst, the second catalyst, and the third catalyst is about 60:20:20 wt % to about 50:30:20 wt %.

Further, in the catalyst layer according to an exemplary embodiment of the present invention, a loading amount of Pd in the first catalyst is about 1 wt % to about 4 wt % based on 100 wt % of the entire first support, and a loading amount of Rh in the second catalyst is about 0.1 wt % to about 1 wt % based on 100 wt % of the entire second support. In addition, a loading amount of Pd in the third catalyst may be about 1 wt % to about 4 wt % based on 100 wt % of the entire third support. In embodiments having these ranges of loading amounts of Pd in the first and third catalysts and Rh in the second catalyst, a more optimal effect may be obtained economically.

The gas purifying catalyst for the internal combustion engine can use any conventional carriers. According to various embodiments, a pellet type carrier, a ceramic monolith type carrier, or a metal wire carrier is used as the carrier supporting the catalyst layer.

The material constituting the carrier may include any conventional material and, preferably, is a ceramic material such as cordierite ($2MgO_2 \cdot 2Al_2O_3 \cdot 5SiO_2$), SiC (silicon carbide), or aluminum titanate.

Figure 2:
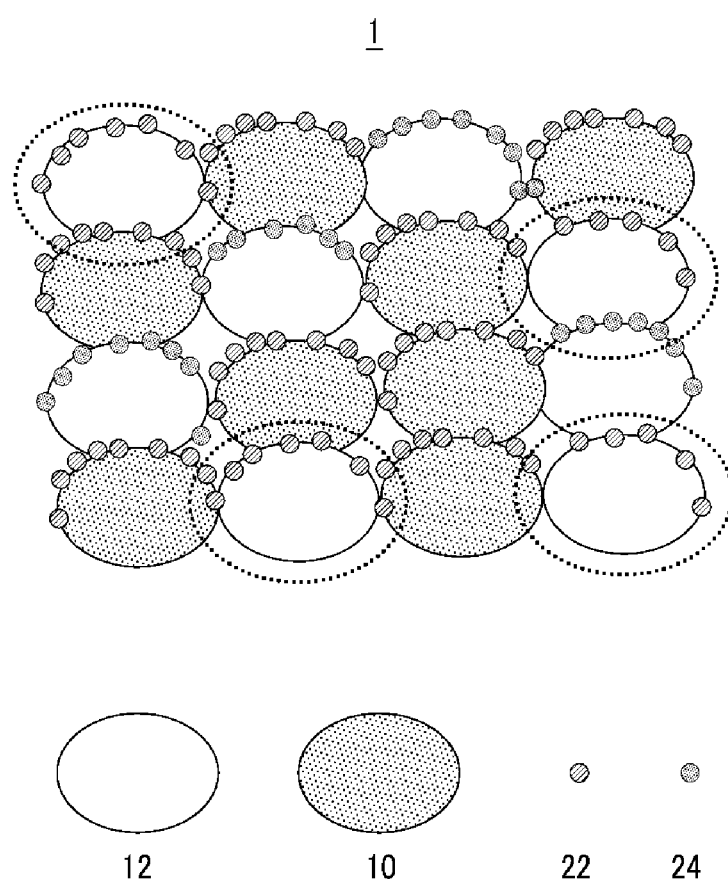
FIG. 2 is a view schematically illustrating a catalyst structure according to an exemplary embodiment of the present invention.

A gas purifying catalyst for an internal combustion engine having the aforementioned constitution according to an exemplary embodiment of the present invention is schematically illustrated in FIG. 2. In FIG. 2, the same reference numerals designate the same materials. As illustrated in FIG. 2, a gas purifying catalyst 1 for the internal combustion engine is constituted by a first catalyst including a first support 10 (which preferably comprises alumina) and Pd 22 supported in the first support 10, a second catalyst including a second support 12 (which preferably comprises a complex oxide of ceria-zirconia) and Rh 24 supported in the second support 12, and a third catalyst including a third support 12 (which preferably comprises a complex oxide of ceria-zirconia) and Pd 22 supported in the third support 12. In the exemplary embodiment shown in FIG. 2, the second support and the third support both include an identical complex oxide of ceria-zirconia.

The gas purifying catalyst for the internal combustion engine having the aforementioned constitution according to the exemplary embodiment of the present invention is preferably prepared by first mixing the first catalyst, the second catalyst, and the third catalyst with each other, and manufacturing a slurry type composition by an impregnation process of adding the mixture to water. Subsequently, the composition is applied on the carrier, dried, and fired to manufacture the gas purifying catalyst. Preferably, the firing process is performed at about 400° C. to about 600° C. for about 2 hours to about 5 hours.

Hereinafter, Examples and Comparative Examples of the present invention will be described. The following Example is only the preferred Example of the present invention, and the present invention is not limited thereto.

Example 1

Pd was supported in the first support by the impregnation method to prepare a first catalyst. The first support comprised alumina and La, specifically where the content of La was 4 wt % based on 100 wt % of the entire first support (based on the total weight of Al and La) was used. The loading amount of Pd was 1.5 wt % based on 100 wt % of the entire first support.

Rh was supported in the second support by the impregnation method to prepare a second catalyst. The second support comprised a complex oxide of ceria-zirconia, particularly wherein the content of ceria was 23 wt % and the content of zirconia was 77 wt % based on the entire second support (based on the total weight of ceria and zirconia). The loading amount of Rh was 0.1 wt % based on 100 wt % of the entire second support.

Pd was supported in the third support by the impregnation method to prepare a third catalyst. The third support comprised a complex oxide of ceria-zirconia, particularly wherein the content of ceria was 40 wt % and the content of zirconia was 55 wt % based on the entire third support (based on the total weight of ceria and zirconia). The loading amount of Pd was 0.5 wt % based on 100 wt % of the entire third support.

The first catalyst, the second catalyst, and the third catalyst were mixed at the ratio of 60:20:20 wt %, and the slurry was prepared by the impregnation method of adding the mixture to water. The slurry was applied on a cordierite monolith carrier, dried, and fired at 500° C. for 2 hours to prepare the catalyst for purifying gas, in which the catalyst layer was formed of the single layer.

Example 2

The catalyst prepared in Example 1 was subjected to a hydrothermal treatment of performing heat treatment in water at 1000° C. for 6 hours, and used as a catalyst for purifying gas.

Reference Example 2

Pd was supported in a first support by the impregnation method to prepare a first catalyst. The first support comprised alumina and La, where the content of La was 4 wt % based on 100 wt % of the entire first support (based on the total weight of Al and La). The loading amount of Pd was 2.35 wt % based on 100 wt % of the entire first support.

Rh was supported in a second support by the impregnation method to prepare a second catalyst. The second support comprised a complex oxide of ceria-zirconia, wherein the content of ceria was 23 wt % and the content of zirconia was 77 wt % in the second support. The loading amount of Rh was 0.1 wt % based on 100 wt % of the entire second support.

The first catalyst and the second catalyst were mixed at the ratio of 60:40 wt %, and the slurry was prepared by the impregnation method of adding the mixture to water. The slurry was applied on the same cordierite monolith carrier as in the Example, dried, and fired at 500° C. for 2 hours to prepare a catalyst for purifying gas, in which the catalyst layer was formed of the single layer.

Reference Example 2

The catalyst prepared in Reference Example 1 was subjected to a hydrothermal treatment of performing heat treatment in water at 1000° C. for 6 hours, and used as the catalyst for purifying gas.

Figure 3:
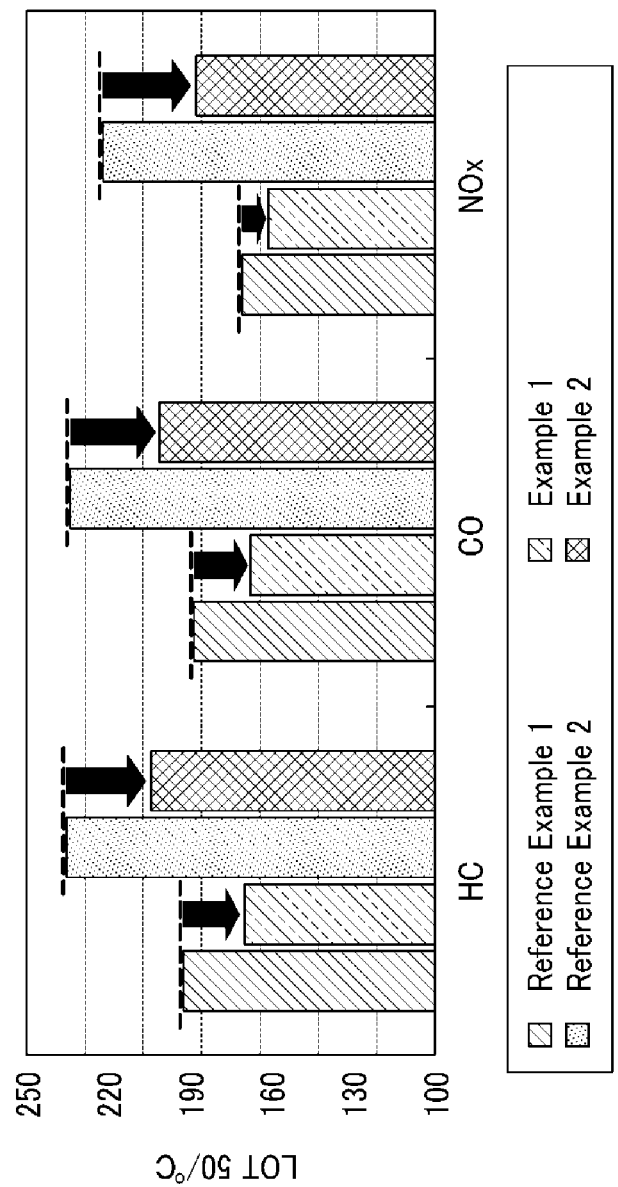
FIG. 3 is a graph obtained by measuring a conversion ratio of contaminant materials of catalysts manufactured according to Examples 1 and 2 and Reference Examples 1 and 2.

The light off temperature to the conversion efficiency of HC, CO, and $NO_x$ of the catalysts according to Examples 1 and 2 and Reference Examples 1 and 2 was measured, and the results thereof are illustrated in FIG. 3. The light off temperature means a temperature of exhaust gas, at which 50% of each contaminant material is converted by the catalyst, and purifying efficiency of the contaminant material is increased as the temperature is reduced.

The light off temperature was obtained by measuring the temperature at which purifying efficiency of HC, CO, and $NO_x$ (the contaminant materials) reached 50% through SIGU2000 (HORIBA) (a catalytic activity evaluating device).

The light off temperature was measured while injecting gas including $N_2$ at a space velocity of 67,000 $hr^{-1}$. Gas including $O_2$ (concentration: 0.98 volume %), CO (concentration: 1.17 volume %), $H_2O$ (concentration: 10 volume %), $CO_2$ (concentration: 13.9 volume %), NO (concentration: 0.1 volume %), HC (concentration: 0.3 volume %), and $N_2$ as the residual was used as the aforementioned gas including $N_2$.

As illustrated in FIG. 3, the catalyst of Example 1 demonstrated a lower light off temperature as compared to the catalyst of Reference Example 1. As such, the purifying efficiency of the contaminant material using the catalyst of Example 1 was very excellent during operation at high temperatures. Further, the catalyst of Example 2 demonstrated a lower light off temperature as compared to the catalyst of Reference Example 2. As such, the purifying efficiency of the contaminant material using the catalyst of Example 2 was very excellent during operation at high temperatures. From the results of FIG. 3, it can be seen that the catalyst according to the exemplary embodiment of the present invention has better purifying efficiency by further using the third catalyst regardless of the hydrothermal treatment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gas purifying catalyst for an internal combustion engine, comprising:
    a carrier and a catalyst layer formed on the carrier,
    wherein the catalyst layer includes:
        a mixture of a first catalyst including Pd as a first active metal supported in a first support, the first support comprising alumina; a second catalyst including Rh as a second active metal supported in a second support, the second support comprising a complex oxide of ceria-zirconia; and a third catalyst including Pd as a third active metal supported in a third support, the third support comprising a complex oxide of ceria-zirconia,
    wherein the catalyst layer is a single layer.

2. The gas purifying catalyst for an internal combustion engine of claim 1, wherein the first support further includes La.

3. The gas purifying catalyst for an internal combustion engine of claim 2, wherein the first, second and third active metals are supported in different supports.

4. The gas purifying catalyst for an internal combustion engine of claim 2, wherein a content of La is about 0.5 wt % to about 5 wt % based on 100 wt % of the first support.

5. The gas purifying catalyst for an internal combustion engine of claim 1, wherein the second support and/or the third support includes about 20 wt % to about 70 wt % of ceria and about 80 wt % to about 30 wt % of zirconia, based on the total amount of ceria and zirconia in the second or third support.

6. The gas purifying catalyst for an internal combustion engine of claim 1, wherein the second support and/or the third support further includes an additive selected from La, Nd, Si, Pr, or a combination thereof.

7. The gas purifying catalyst for an internal combustion engine of claim 6, wherein a content of the additive is about 1 wt % to about 20 wt % based on 100 wt % of the second support or the third support.

8. The gas purifying catalyst for an internal combustion engine of claim 1, wherein a mixing ratio of the first catalyst, the second catalyst, and the third catalyst is about 60:20:20 wt % to about 50:30:20 wt %.

9. The gas purifying catalyst for an internal combustion engine of claim 1, wherein a loading amount of Pd in the first catalyst is about 1 wt % to about 4 wt % based on 100 wt % of the first support.

10. The gas purifying catalyst for an internal combustion engine of claim 1, wherein a loading amount of Rh in the second catalyst is about 0.1 wt % to about 1 wt % based on 100 wt % of the second support.

11. The gas purifying catalyst for an internal combustion engine of claim 1, wherein a loading amount of Pd in the third catalyst is about 1 wt % to about 4 wt % based on 100 wt % of the third support.

12. A gas purifying catalyst for an internal combustion engine, comprising:
    a carrier and a catalyst layer formed on the carrier,
    wherein the catalyst layer includes:
    at least one catalyst including Pd as a first active metal supported in a support, the support comprising a complex oxide of ceria-zirconia, and
    wherein the catalyst layer is a single layer,
    wherein the gas purifying catalyst further comprises a second catalyst including Rh as a second active metal supported in a second support, the second support comprising a complex oxide of ceria-zirconia, a third catalyst including Pd as a third active metal supported in a third support, the third support comprising a complex oxide of ceria-zirconia.

13. The gas purifying catalyst for an internal combustion engine of claim 12, wherein the first, second and third active metals are supported in different supports.

* * * * *